Patented Feb. 20, 1945

2,369,683

UNITED STATES PATENT OFFICE 2,369,683

PROCESS OF PREPARING RESINOUS MATERIAL

Charles G. Moore, River Forest, Ill., assignor to The Glidden Company, Cleveland, Ohio, a corporation of Ohio No Drawing. Application November 8, 1941, Serial No. 418,384

4 Claims. (Cl. 260—22)

The present invention relates to a method of reacting together oil acids, glycerine, maleic anhydride and an oil, in a manner to yield a clear homogeneous mass and to the product. This product is miscible with drying and semi-drying oils and many resins employed in varnish making.

It has been recognized for a long time that maleic acid or anhydride does not react in an alkyd resin in the same manner as phthalic anhydride. For example, if oil fatty acids, glycerine and maleic anhydride are reacted together at an elevated temperature, the maleic anhydride and glycerine react rapidly to form a layer separate from the fatty acids and the balance of the glycerine. These two layers are immiscible and upon further heating the maleic acid-glycerine ester gels and finally chars, leaving the other layer still liquid. This gelling action is thought to occur because the rate of polymerization is faster than that of the esterification with the result that gelation occurs before the acid number has been sufficiently lowered.

Other methods of carrying out the reaction to produce useful products have been studied. Rosenblum in United States Patent No. 2,063,855 reacts oil acids and glycerine to produce a diglyceride of low acid value, then adds the maleic acid and completes the reaction to produce a homogeneous viscous mass of low acid value. In his patent he recognizes that his method is not applicable to yield a product of acid value below 80–100, when the monoglyceride of an oil fatty acid is handled in the same manner.

The present invention describes a method of reacting a partially reacted fatty acid monoglyceride with maleic anhydride, and during this reaction dispersing the product in a drying or semi-drying oil.

In general the method employed by me in carrying out this process is as follows:

One mol of glycerine is heated together with one mol of a drying or semi-drying oil fatty acid. This part of the reaction may be carried out either in the presence or absence of an inert atmosphere such as nitrogen or carbon dioxide, but generally with good mechanical agitation. This reaction is carried to about 450° F., when the whole mass becomes clear and transparent. This reaction mass has a high acid value, about 60–80, indicating the presence of monoglyceride and uncombined glycerine and fatty acid. The temperature of this product (or mixture of products) is then reduced to about 400°–420° F., and one mole of maleic anhydride is added. During this addition and throughout the balance of the process, good mechanical agitation must be used, while the use of an inert atmosphere is optional. The product obtained at this point is then reheated to about 410° F., and a drying or semi-drying oil is gradually added to the reaction product, maintaining the temperature at about 410° F., throughout this addition. When all the oil has been added, the final product may be heated further or allowed to cool immediately, depending upon the oil and oil acids employed, as well as the amount of oil used in the last step of the process.

The addition of the oil in the final step must be handled with care, otherwise a clear, homogeneous product will not be obtained. If the oil is added too rapidly or at too low a temperature, it will separate and yield a cloudy mixture. Even if the oil is heated to the temperature of the material to which it is added, namely 410°–420° F., and then added all at once, it will not disperse properly and yields a cloudy mixture. If the reaction product of oil acids, glycerine, and maleic anhydride is cooled to room temperature, and oil is added at that temperature and the whole heated to 400°–450° F., with good agitation, a clear homogeneous product is not obtained.

The success of the process depends upon the addition of the oil, in which the resinous portion is dispersed, at the proper rate and temperature, and in the presence of proper mechanical agitation.

When a suitable amount of oil is employed in dispersing the fatty acid-glycerol-maleic anhydride complex the resulting product is miscible in all proportions with drying and semi-drying oils. The acid value of the final product may be anywhere from 5–75, depending upon the oil and oil acids employed, the amount of oil added, and length of time the final product is heated at an elevated temperature.

The following are examples of the process described above:

Example 1

| | Grams |
|---|---|
| Soya fatty acids | 632 |
| 95% glycerine | 220 |
| Maleic anhydride | 212 |
| Linseed oil | 600 |

The soya fatty acids and glycerine are heated together with good agitation in an atmosphere of carbon dioxide to 450° F. The temperature is then reduced to 410° F. and the maleic anhydride is added. The temperature is again raised to 410° F. and the linseed oil is added from a separatory funnel is 35-40 min. During the addition of the linseed oil, the batch is held at 410° F., and the agitation is continued. The final product is further heated at 360° F. for about two hours and allowed to cool. The resulting product was a clear pale oil, fairly heavy in viscosity, and with an acid value of about 38. This product is soluble in petroleum solvent and miscible with other oils.

*Example 2*

|  | Grams |
|---|---|
| Fish oil fatty acids | 316 |
| 95% glycerine | 110 |
| Maleic anhydride | 106 |
| Linseed oil | 1,050 |

This material is processed in the same manner as outlined in example one, with the exception that a somewhat longer time is employed in the addition of the linseed oil. The final acid value of this oil was 26.

*Example 3*

|  | Grams |
|---|---|
| Linseed oil acids | 316 |
| 95% glycerine | 110 |
| Maleic anhydride | 106 |
| Dehydrated castor oil | 1,050 |

This material is processed in the same manner as indicated in Example 2.

*Example 4*

|  | Grams |
|---|---|
| Linseed oil acids | 316 |
| 95% glycerine | 110 |
| Maleic anhydride | 106 |
| Linseed oil | 790 |
| Fish oil | 260 |

This material is cooked in the same manner as shown in Example 2. The final acid value of this product was 20.

The oils prepared according to the examples given may be mixed with other oils and resins and cooked in the usual manner to produce varnishes of excellent drying properties, good water resistance and excellent durability on exposure to weather. These varnishes may also be pigmented to produce enamels.

The product prepared in the examples given, as well as when other combinations of oils and oil acids are employed, may be further bodied. This bodying increases the viscosity of the oils, and if heated at a high temperature for a long period of time finally produce gels. These bodied oils may also be used in the manufacture of printing inks and the like.

If desired, in this process, mixtures of the fatty acids may be employed, as well as mixtures of the modifying oils.

Having described the invention what is claimed is:

1. The process which consists essentially in heating together a mixture of a monoglyceride product produced by esterification of equimolecular proportions of glycerine and an oil acid selected from the class consisting of drying and semi-drying oil fatty acids until the product has an acid number of 60-80 with an equimolecular quantity of maleic anhydride to said mono-glyceride product at a temperature of 400 to 420° F. with agitation and then slowly adding to said mixture an oil selected from the class consisting of drying and semi-drying oils, while maintaining the temperature at about 410° F. throughout the addition of the oil, the rate of addition of the oil being slow enough to prevent separation of the product.

2. The process which consists essentially in heating together a mixture of a mono-glyceride product produced by esterification of equimolecular proportions of glycerine and of fatty acids selected from the class consisting of drying and semi-drying oil fatty acids until the product has an acid number of 60 to 80 with an equimolecular quantity of maleic anhydride to said mono-glyceride product at a temperature of 400 to 420° F. with agitation, and then slowly adding thereto with agitation oils selected from the class consisting of drying and semi-drying oils while maintaining the temperature at about 410° F. throughout the addition of the oil, the rate of addition of the oil being slow enough to prevent separation of the product, and continuing the heating after the addition of the oil to lower the acid number but for a time insufficient to cause gelling.

3. The process which consists essentially in reacting together an equimolecular proportion of glycerol and an oil acid selected from the class consisting of fatty acids of drying and semi-drying oils to produce an incompletely esterified monoglyceride product having an acid number of 60–80, adding an equimolecular quantity of maleic anhydride to said mono-glyceride product at a temperature of 400 to 420° F. with agitation, then slowly adding an oil selected from the class consisting of drying and semi-drying oils to the thus formed mixture with agitation while maintaining the temperature at about 410° F., the rate of addition of the oil being slow enough to prevent separation of the product.

4. The process which consists essentially in reacting together an equimolecular proportion of glycerol and an oil acid selected from the class consisting of fatty acids of drying and semi-drying oils to produce an incompletely esterified monoglyceride product having an acid number of 60 to 80, adding an equimolecular quantity of maleic anhydride to said monoglyceride product at a temperature of 400 to 420° F. with agitation, then slowly adding an oil selected from the class consisting of drying and semi-drying oils to the thus formed mixture with agitation while maintaining the temperature at about 410° F., the rate of addition of the oil being slow enough to prevent separation of the product, and continuing the heating after the addition of the oil to lower the acid number but insufficient to cause gelling.

CHARLES G. MOORE.